US012786466B2

(12) United States Patent
Wang et al.

(10) Patent No.: US 12,786,466 B2
(45) Date of Patent: Nov. 3, 2026

(54) METHOD, APPARATUS, AND MEDIUM FOR POINT CLOUD CODING

(71) Applicants: Beijing Bytedance Network Technology Co., Ltd., Beijing (CN); Bytedance Inc., Los Angeles, CA (US)

(72) Inventors: Wenyi Wang, Beijing (CN); Yingzhan Xu, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 10 days.

(21) Appl. No.: 18/915,068

(22) Filed: Oct. 14, 2024

(65) Prior Publication Data

US 2025/0039446 A1 Jan. 30, 2025

Related U.S. Application Data

(63) Continuation of application No. PCT/CN2023/088229, filed on Apr. 13, 2023.

(30) Foreign Application Priority Data

Apr. 14, 2022 (WO) ................ PCT/CN2022/086905

(51) Int. Cl.
*H04N 19/597* (2014.01)
*H04N 19/70* (2014.01)

(52) U.S. Cl.
CPC ........... *H04N 19/597* (2014.11); *H04N 19/70* (2014.11)

(58) Field of Classification Search
CPC ....... H04N 19/597; H04N 19/70; H04N 19/96
See application file for complete search history.

(56) References Cited

U.S. PATENT DOCUMENTS

2021/0400103 A1* 12/2021 Hur ......................... H04L 67/06
2022/0303577 A1* 9/2022 Sugio ................... H04N 19/597

FOREIGN PATENT DOCUMENTS

CN 113475083 A 10/2021
CN 113796014 A 12/2021
WO 2021045601 A1 3/2021
WO 2021242064 A1 12/2021
WO 2021256486 A1 12/2021
(Continued)

OTHER PUBLICATIONS

International Search Report for PCT/CN2023/088229, mailed on Jul. 6, 2023, 4 pages.
(Continued)

*Primary Examiner* — Kathleen V Nguyen
(74) *Attorney, Agent, or Firm* — Astute IP Law Group

(57) ABSTRACT

Embodiments of the present disclosure provide a solution for point cloud coding. A method for point cloud coding is proposed. The method comprises: determining, for a conversion between a current coding unit of a point cloud sequence and a bitstream of the point cloud sequence, a plurality of points of the current coding unit; sorting the plurality of points at least based on a sorting parameter, and performing the conversion based on the plurality of sorted points.

19 Claims, 7 Drawing Sheets

(56) References Cited

FOREIGN PATENT DOCUMENTS

WO 2022191872 A1 9/2022

OTHER PUBLICATIONS

Extended European Search Report received for European Patent Application No. 23787810.3, mailed on Jan. 21, 2026, 12 pages.

www.iso.org, "Information Technology—MPEG-I (Coded Representation of Immersive Media)—Part 9: Geometry-based Point Cloud Compression", ISO/IEC 23090-9:2019(E), ISO/IEC JTC 1/SC 29/WG 11, 2019, 89 pages.

* cited by examiner

METHOD, APPARATUS, AND MEDIUM FOR POINT CLOUD CODING

CROSS REFERENCE TO RELATED APPLICATIONS

This application is a continuation of International Application No. PCT/CN2023/088229, filed on Apr. 13, 2023, which claims the benefit of International Application No. PCT/CN2022/086905 filed on Apr. 14, 2022. The entire contents of these applications are hereby incorporated by reference in their entireties.

FIELD

Embodiments of the present disclosure relates generally to point cloud coding techniques, and more particularly, to points sorting with sorting parameter.

BACKGROUND

A point cloud is a collection of individual data points in a three-dimensional (3D) plane with each point having a set coordinate on the X, Y, and Z axes. Thus, a point cloud may be used to represent the physical content of the three-dimensional space. Point clouds have shown to be a promising way to represent 3D visual data for a wide range of immersive applications, from augmented reality to autonomous cars.

Point cloud coding standards have evolved primarily through the development of the well-known MPEG organization. MPEG, short for Moving Picture Experts Group, is one of the main standardization groups dealing with multimedia. In 2017, the MPEG 3D Graphics Coding group (3DG) published a call for proposals (CFP) document to start to develop point cloud coding standard. The final standard will consist in two classes of solutions. Video-based Point Cloud Compression (V-PCC or VPCC) is appropriate for point sets with a relatively uniform distribution of points. Geometry-based Point Cloud Compression (G-PCC or GPCC) is appropriate for more sparse distributions. However, coding efficiency of conventional point cloud coding techniques is generally expected to be further improved.

SUMMARY

Embodiments of the present disclosure provide a solution for point cloud coding.

In a first aspect, a method for point cloud coding is proposed. The method comprises: determining, for a conversion between a current coding unit of a point cloud sequence and a bitstream of the point cloud sequence, a plurality of points of the current coding unit; sorting the plurality of points at least based on a sorting parameter; and performing the conversion based on the plurality of sorted points. The method in accordance with the first aspect of the present disclosure sorts the plurality of points of the coding unit based on the sorting parameter. n this way, the latency of the sorting process can be reduced, and thus a low latency tool can be achieved.

In a second aspect, another method for point cloud coding is proposed. The method comprises: determining, for a conversion between a current coding unit of a point cloud sequence and a bitstream of the point cloud sequence, based on an indicator of tree structure information, whether tree structure information of predictive geometry coding of the current coding unit is included in the bitstream; and performing the conversion based on the determining. The method in accordance with the second aspect of the present disclosure determines whether the tree structure information is included or signaled in the bitstream. In this way, the latency of the conversion can be reduced, and thus a low latency tool can be achieved.

In a third aspect, an apparatus for processing point cloud sequence is proposed. The apparatus for processing point cloud sequence comprises a processor and a non-transitory memory with instructions thereon. The instructions upon execution by the processor, cause the processor to perform a method in accordance with the first or second aspect of the present disclosure.

In a fourth aspect, a non-transitory computer-readable storage medium is proposed. The non-transitory computer-readable storage medium stores instructions that cause a processor to perform a method in accordance with the first or second aspect of the present disclosure.

In a fifth aspect, a non-transitory computer-readable recording medium is proposed. The non-transitory computer-readable recording medium stores a bitstream of a point cloud sequence which is generated by a method performed by a point cloud processing apparatus. The method comprises: determining a plurality of points of a current coding unit of the point cloud sequence; sorting the plurality of points at least based on a sorting parameter; and generating the bitstream based on the plurality of sorted points.

In a sixth aspect, a method for storing a bitstream of a point cloud sequence is proposed. The method comprises: determining a plurality of points of a current coding unit of the point cloud sequence; sorting the plurality of points at least based on a sorting parameter; generating the bitstream based on the plurality of sorted points; and storing the bitstream in a non-transitory computer-readable recording medium.

In a seventh aspect, another non-transitory computer-readable recording medium is proposed. The non-transitory computer-readable recording medium stores a bitstream of a point cloud sequence which is generated by a method performed by a point cloud processing apparatus. The method comprises: determining, based on an indicator of tree structure information, whether tree structure information of predictive geometry coding of a current coding unit of the point cloud sequence is included in the bitstream; and generating the bitstream based on the determining.

In an eighth aspect, a method for storing a bitstream of a point cloud sequence is proposed. The method comprises: determining, based on an indicator of tree structure information, whether tree structure information of predictive geometry coding of a current coding unit of the point cloud sequence is included in the bitstream; generating the bitstream based on the determining; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has". "having". "includes" and/or "including", when used herein, specify the presence of stated features, elements, and/or components etc., but do not preclude the presence or addition of one or more other features, elements, components and/or combinations thereof.

Example Environment

Figure 1:
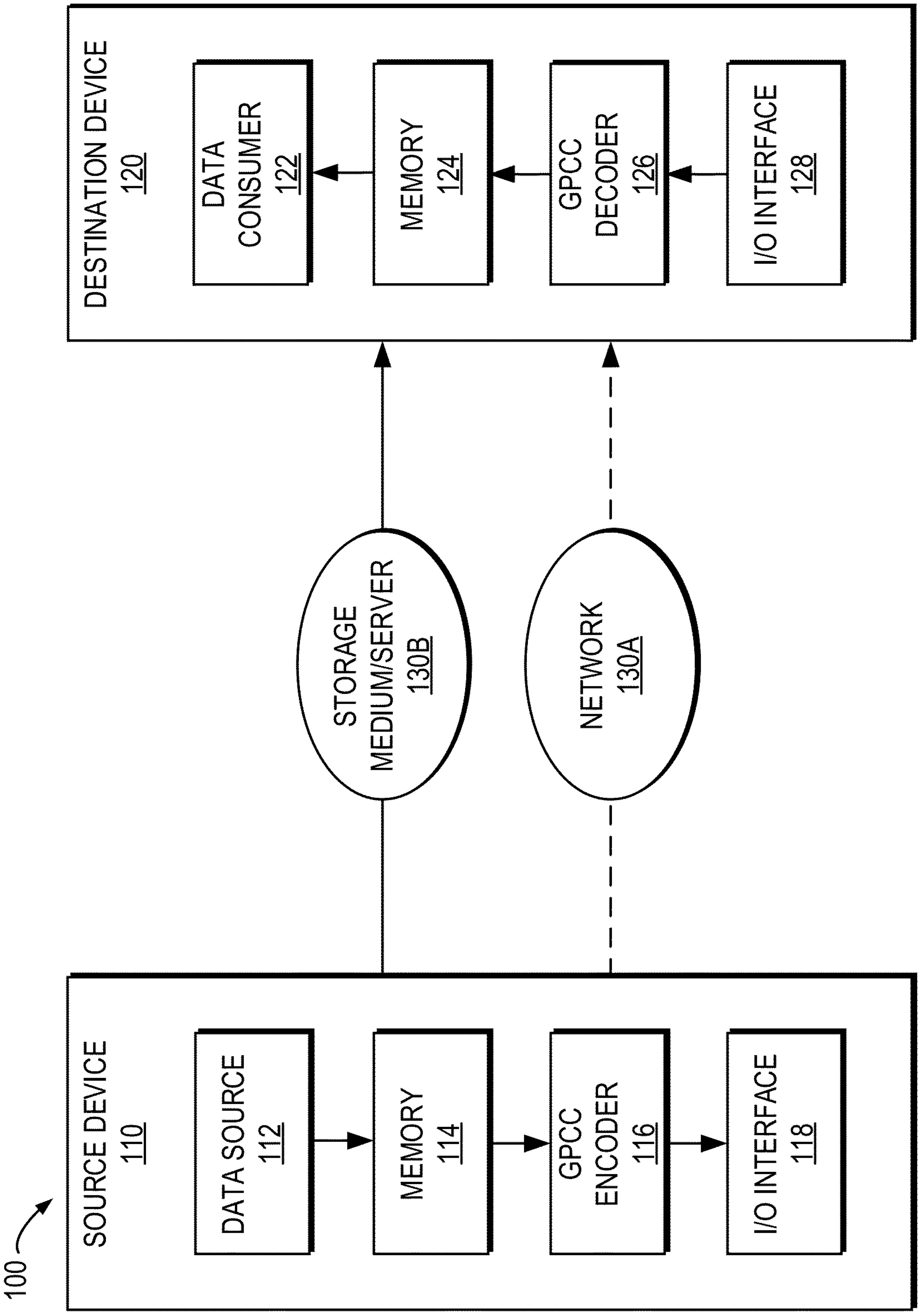
FIG. 1 illustrates a block diagram that illustrates an example point cloud coding system, in accordance with some embodiments of the present disclosure.

FIG. 1 is a block diagram that illustrates an example point cloud coding system 100 that may utilize the techniques of the present disclosure. As shown, the point cloud coding system 100 may include a source device 110 and a destination device 120. The source device 110 can be also referred to as a point cloud encoding device, and the destination device 120 can be also referred to as a point cloud decoding device. In operation, the source device 110 can be configured to generate encoded point cloud data and the destination device 120 can be configured to decode the encoded point cloud data generated by the source device 110. The techniques of this disclosure are generally directed to coding (encoding and/or decoding) point cloud data, i.e., to support point cloud compression. The coding may be effective in compressing and/or decompressing point cloud data.

Source device 100 and destination device 120 may comprise any of a wide range of devices, including desktop computers, notebook (i.e., laptop) computers, tablet computers, set-top boxes, telephone handsets such as smartphones and mobile phones, televisions, cameras, display devices, digital media players, video gaming consoles, video streaming devices, vehicles (e.g., terrestrial or marine vehicles, spacecraft, aircraft, etc.), robots, LIDAR devices, satellites, extended reality devices, or the like. In some cases, source device 100 and destination device 120 may be equipped for wireless communication.

The source device 100 may include a data source 112, a memory 114, a GPCC encoder 116, and an input/output (I/O) interface 118. The destination device 120 may include an input/output (I/O) interface 128, a GPCC decoder 126, a memory 124, and a data consumer 122. In accordance with this disclosure, GPCC encoder 116 of source device 100 and GPCC decoder 126 of destination device 120 may be configured to apply the techniques of this disclosure related to point cloud coding. Thus, source device 100 represents an example of an encoding device, while destination device 120 represents an example of a decoding device. In other examples, source device 100 and destination device 120 may include other components or arrangements. For example, source device 100 may receive data (e.g., point cloud data) from an internal or external source. Likewise, destination device 120 may interface with an external data consumer, rather than include a data consumer in the same device.

In general, data source 112 represents a source of point cloud data (i.e., raw, unencoded point cloud data) and may provide a sequential series of "frames" of the point cloud data to GPCC encoder 116, which encodes point cloud data for the frames. In some examples, data source 112 generates the point cloud data. Data source 112 of source device 100 may include a point cloud capture device, such as any of a variety of cameras or sensors, e.g., one or more video cameras, an archive containing previously captured point cloud data, a 3D scanner or a light detection and ranging (LIDAR) device, and/or a data feed interface to receive point cloud data from a data content provider. Thus, in some examples, data source 112 may generate the point cloud data based on signals from a LIDAR apparatus. Alternatively or additionally, point cloud data may be computer-generated from scanner, camera, sensor or other data. For example, data source 112 may generate the point cloud data, or produce a combination of live point cloud data, archived point cloud data, and computer-generated point cloud data. In each case, GPCC encoder 116 encodes the captured, pre-captured, or computer-generated point cloud data. GPCC encoder 116 may rearrange frames of the point cloud data from the received order (sometimes referred to as "display order") into a coding order for coding. GPCC encoder 116 may generate one or more bitstreams including encoded point cloud data. Source device 100 may then output the encoded point cloud data via I/O interface 118 for reception and/or retrieval by, e.g., I/O interface 128 of destination device 120. The encoded point cloud data may be transmitted directly to destination device 120 via the I/O interface 118 through the network 130A. The encoded point cloud data may also be stored onto a storage medium/server 130B for access by destination device 120.

Memory 114 of source device 100 and memory 124 of destination device 120 may represent general purpose memories. In some examples, memory 114 and memory 124 may store raw point cloud data, e.g., raw point cloud data from data source 112 and raw, decoded point cloud data from GPCC decoder 126. In addition, or alternatively, memory 114 and memory 124 may store software instructions executable by, e.g., GPCC encoder 116 and GPCC decoder 126, respectively. Although memory 114 and memory 124 are shown separately from GPCC encoder 116 and GPCC decoder 126 in this example, it should be understood that GPCC encoder 116 and GPCC decoder 126 may also include internal memories for functionally similar or equivalent purposes. Furthermore, memory 114 and memory 124 may store encoded point cloud data, e.g., output from GPCC encoder 116 and input to GPCC decoder 126. In some examples, portions of memory 114 and memory 124 may be allocated as one or more buffers, e.g., to store raw, decoded, and/or encoded point cloud data. For instance, memory 114 and memory 124 may store point cloud data.

I/O interface 118 and I/O interface 128 may represent wireless transmitters/receivers, modems, wired networking components (e.g., Ethernet cards), wireless communication components that operate according to any of a variety of IEEE 802.11 standards, or other physical components. In examples where I/O interface 118 and I/O interface 128 comprise wireless components, I/O interface 118 and I/O interface 128 may be configured to transfer data, such as encoded point cloud data, according to a cellular communication standard, such as 4G, 4G-LTE (Long-Term Evolution), LTE Advanced, 5G, or the like. In some examples where I/O interface 118 comprises a wireless transmitter, I/O interface 118 and I/O interface 128 may be configured to transfer data, such as encoded point cloud data, according to other wireless standards, such as an IEEE 802.11 specification. In some examples, source device 100 and/or destination device 120 may include respective system-on-a-chip (SoC) devices. For example, source device 100 may include an SoC device to perform the functionality attributed to GPCC encoder 116 and/or I/O interface 118, and destination device 120 may include an SoC device to perform the functionality attributed to GPCC decoder 126 and/or I/O interface 128.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

I/O) interface 128 of destination device 120 receives an encoded bitstream from source device 110. The encoded bitstream may include signaling information defined by GPCC encoder 116, which is also used by GPCC decoder 126, such as syntax elements having values that represent a point cloud. Data consumer 122 uses the decoded data. For example, data consumer 122 may use the decoded point cloud data to determine the locations of physical objects. In some examples, data consumer 122 may comprise a display to present imagery based on the point cloud data.

GPCC encoder 116 and GPCC decoder 126 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of GPCC encoder 116 and GPCC decoder 126 may be included in one or more encoders or decoders, either of which may be integrated as part of a combined encoder/decoder (CODEC) in a respective device. A device including GPCC encoder 116 and/or GPCC decoder 126 may comprise one or more integrated circuits, microprocessors, and/or other types of devices.

GPCC encoder 116 and GPCC decoder 126 may operate according to a coding standard, such as video point cloud compression (VPCC) standard or a geometry point cloud compression (GPCC) standard. This disclosure may generally refer to coding (e.g., encoding and decoding) of frames to include the process of encoding or decoding data. An encoded bitstream generally includes a series of values for syntax elements representative of coding decisions (e.g., coding modes).

A point cloud may contain a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

Figure 2:
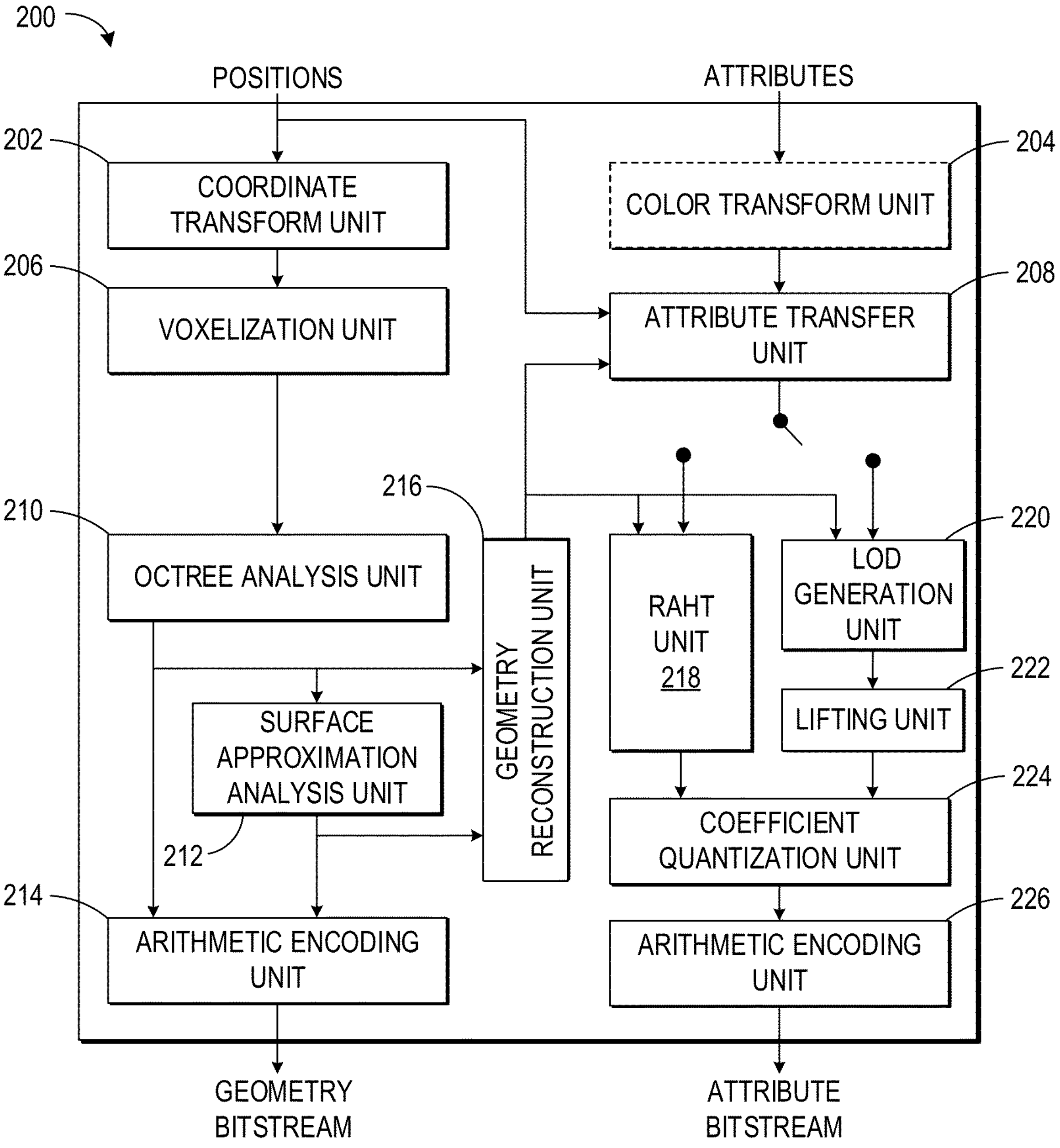
FIG. 2 illustrates a block diagram that illustrates an example of a GPCC encoder, in accordance with some embodiments of the present disclosure.
Figure 3:
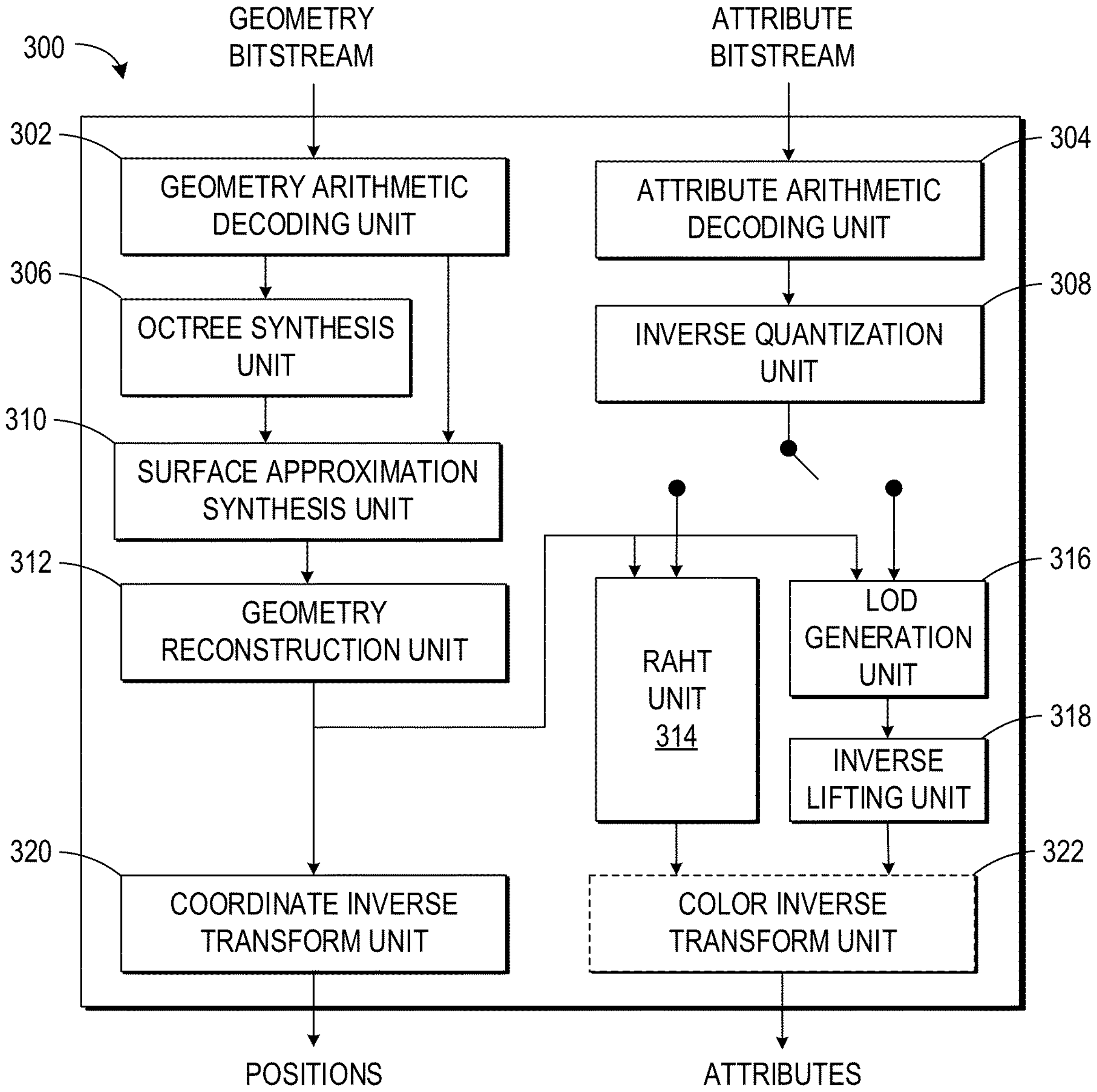
FIG. 3 illustrates a block diagram that illustrates an example of a GPCC decoder, in accordance with some embodiments of the present disclosure.

FIG. 2 is a block diagram illustrating an example of a GPCC encoder 200, which may be an example of the GPCC encoder 116 in the system 100 illustrated in FIG. 1, in accordance with some embodiments of the present disclosure. FIG. 3 is a block diagram illustrating an example of a GPCC decoder 300, which may be an example of the GPCC decoder 126 in the system 100 illustrated in FIG. 1, in accordance with some embodiments of the present disclosure.

In both GPCC encoder 200 and GPCC decoder 300, point cloud positions are coded first. Attribute coding depends on the decoded geometry. In FIG. 2 and FIG. 3, the region adaptive hierarchical transform (RAHT) unit 218, surface approximation analysis unit 212, RAHT unit 314 and surface approximation synthesis unit 310 are options typically used for Category 1 data. The level-of-detail (LOD) generation unit 220, lifting unit 222, LOD generation unit 316 and inverse lifting unit 318 are options typically used for Category 3 data. All the other units are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

In the example of FIG. 2, GPCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, GPCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to convert color information of the attributes to a different domain. For example, color transform unit 204 may convert color information from an RGB color space to a YCbCr color space.

Furthermore, in the example of FIG. 2, voxelization unit 206 may voxelize the transform coordinates. Voxelization of the transform coordinates may include quantizing and removing some points of the point cloud. In other words, multiple points of the point cloud may be subsumed within a single "voxel." which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may perform arithmetic encoding on syntax elements representing the information of the octree and/or surfaces determined by surface approximation analysis unit 212. GPCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud data.

Furthermore, RAHT unit 218 may apply RAHT coding to the attributes of the reconstructed points. Alternatively, or in addition, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. GPCC encoder 200 may output these syntax elements in an attribute bitstream.

In the example of FIG. 3, GPCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, a coordinate inverse transform unit 320, and a color inverse transform unit 322.

GPCC decoder 300 may obtain a geometry bitstream and an attribute bitstream. Geometry arithmetic decoding unit 302 of decoder 300 may apply arithmetic decoding (e.g., CABAC or other type of arithmetic decoding) to syntax elements in the geometry bitstream. Similarly, attribute arithmetic decoding unit 304 may apply arithmetic decoding to syntax elements in attribute bitstream.

Octree synthesis unit 306 may synthesize an octree based on syntax elements parsed from geometry bitstream. In instances where surface approximation is used in geometry bitstream, surface approximation synthesis unit 310 may determine a surface model based on syntax elements parsed from geometry bitstream and based on the octree.

Furthermore, geometry reconstruction unit 312 may perform a reconstruction to determine coordinates of points in a point cloud. Coordinate inverse transform unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, color inverse transform unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, color inverse transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to GPCC or other specific point cloud codecs, the disclosed techniques are applicable to other point cloud coding technologies also. Furthermore, while some embodiments describe point cloud coding steps in detail, it will be understood that corresponding steps decoding that undo the coding will be implemented by a decoder.

1. Brief Summary

This disclosure is related to point cloud coding technologies. Specifically, it is related to point cloud low latency coding. The ideas may be applied individually or in various combination, to any point cloud coding standard or non-standard point cloud codec, e.g., the being-developed Geometry based Point Cloud Compression (G-PCC).

2. Abbreviations

G-PCC Geometry based Point Cloud Compression
MPEG Moving Picture Experts Group
3DG 3D Graphics Coding Group
CFP Call For Proposal
V-PCC Video-based Point Cloud Compression
RAHT Region-Adaptive Hierarchical Transform
LOD Level Of Detail
SPS Sequence Parameter Set
APS Attribute Parameter Set
GPS Geometry Parameter Set

3. Introduction

MPEG, short for Moving Picture Experts Group, is one of the main standardization groups dealing with multimedia. In 2017, the MPEG 3D Graphics Coding group (3DG) published a call for proposals (CFP) document to start to develop point cloud coding standard. The final standard will consist in two classes of solutions. Video-based Point Cloud Compression (V-PCC) is appropriate for point sets with a relatively uniform distribution of points. Geometry-based Point Cloud Compression (G-PCC) is appropriate for more sparse distributions. Both V-PCC and G-PCC support the coding and decoding for single point cloud and point cloud sequence.

In one point cloud, there may be geometry information and attribute information. Geometry information is used to describe the geometry locations of the data points. Attribute information is used to record some details of the data points, such as textures, normal vectors, reflections and so on. Point cloud codec can process the various information in different ways. Usually there are many optional tools in the codec to support the coding and decoding of geometry information and attribute information respectively.

There is strong demand about low latency for quick transmission/analysis in some point cloud data applications, such as 3D mapping and automotive applications. One of definition of low latency is as follows. On the encoder side, low latency is defined as a limited end-to-end size of buffer of points from, on one end, receiving a point at the encoder input to, on the other end, outputting in a bitstream coded data sufficient to represent the 3D position and/or attributes of said point. On the decoder side, low latency is defined as a limited end-to-end size of buffer of points from, on one end, receiving from the bitstream data sufficient to represent a coded point to, on the other end, outputting the decoded 3D position and/or attributes of said coded point. It can be simply interpreted that given a list of input points, the end-to-end latency is the maximum distance that a point may be displaced in the list.

In G-PCC, there are two level coding tools to support low latency applications. One level is slice level low latency tool. The other level is low latency tool inside a slice.

3.1 Slice Level Low Latency Tool

In G-PCC, a point cloud frame can be is divided into several slices which can be independently encoded and decoded. A slice is an list of points. There are many advantages about the slice based coding structure, such as supporting parallel encoding and decoding, avoiding error propagation and supporting low latency, etc. Several slicing methods have been adopted to G-PCC. The only one slicing method is as follows. Given a list of input points, generate a new slice every n points. The coding latency of one frame can be controlled by the value of n. Smaller the value of n, lower the latency.

3.2 Geometry Low Latency Tool Inside a Slice

There are three optional geometry coding tools in G-PCC. They are octree geometry encoding, trisoup geometry encoding and predictive geometry coding separately. Only predictive geometry coding supports low latency applications.

Octree geometry encoding leverages point cloud geometry spatial correlation. If geometry coding tools is enabled, a cubical axis-aligned bounding box, associated with octree root node, will be determined according to point cloud geometry information. Then the bounding box will be subdivided into 8 sub-cubes, which are associated with 8 sub-nodes of root node (a cube is equivalent to node hereafter). An 8-bit code is then generated by specific order to indicate whether the 8 sub-nodes contain points separately, where one bit is associated with one sub-node. The bit associated with one sub-node is named occupancy bit and the 8-bit code generated is named occupancy code. The generated occupancy code will be signaled according to the occupancy information of neighbor node. Then only the nodes which contain points will be subdivided into 8 sub-nodes furtherly. The process will be performed recursively until the node size is 1. So, the point cloud geometry information is converted into occupancy code sequences. Trisoup geometry encoding is a geometry coding option that represents the object surface as a series of triangle mesh. It is applicable for a dense surface point cloud. The decoder generates point cloud from the mesh surface in the specified voxel granularity so that it assures the density of the reconstructed point cloud.

Predictive geometry coding is introduced as an alternative to octree geometry encoding and trisoup geometry encoding. It supports low latency applications and has low complexity decoding. Its main target is sparse point cloud content. It starts by defining a prediction structure on the point cloud. Such structure could be described by a prediction tree, where each point in the point cloud is associated with a vertex of the tree. Each vertex could predict only from its ancestors in the tree. Various prediction strategies are possible, such as no prediction, delta prediction, linear prediction and Parallelogram prediction. The tree structure is encoded be traversing the tree in a depth order and encoding for each vertex the number of its children. The positions of the vertices are encoded by storing the chosen prediction mode and the obtained prediction residuals. Arithmetic coding is used to further compress the generated values. Building the optimal prediction tree is an NP-hard problem. The encoder could use different heuristics to build sub-optimal prediction trees that offer various compromises.

For supporting low latency applications, the predictive geometry coding support window-based prediction. In this case, the encoder processes the points in the same order as they are received. A buffer of limited size is used to limit the system latency. When looking for the best predictor for each vertex, the encoder will consider only the points that are in the buffer. In other words, the prediction tree structure will be generated every n points. Similar with the low latency slicing method, the coding latency can be controlled by the value of n. The smaller the value of n, the lower the latency.

3.3 Attribute Low Latency Tool Inside a Slice

There are three optional attribute coding tools in G-PCC. They are predicting transform, lifting transform and RAHT separately. By imposing certain restrictions, predicting transform and lifting transform can support low delay applications.

Predicting transform is an interpolation-based hierarchical nearest neighbors prediction method, which is typically used for sparse point cloud content. Predicting transform depends on LOD structure which distributes the input points in sets of refinements levels. And it comprises 1) LOD generation, 2) nearest neighbors search and 3) attribute prediction. In the LOD generation process, the geometry information is then leveraged to build a hierarchical structure of the point cloud, which defines a set of LODs. The hierarchical structure is exploited in order to efficiently predict attributes. It also makes it possible to provide advanced functionalities such as progressive transmission and scalable rendering. In the nearest neighbors search process, G-PCC will find at most three nearest neighbors from the already encoded/decoded points for every point. In the attribute prediction process, a linear interpolation process based on the distances of the at most three nearest neighbors will be used to predict current point attribute. In predicting transform, the Morton order that the points are sorted according to their associated Morton codes in an ascending order is used to help search the nearest points. That is because the smaller the difference between the Morton codes of two points, the closer they are likely to be.

When the number of LOD is equal to 1, the prediction structure of the predicting transform will be simplified. Firstly, the points are sorted according to their associated Morton codes in an ascending order. Let/be the array of point indexes ordered according to this process. Then, the encoder/decoder compresses/decompresses respectively the points according to the order defined by 1. At each iteration i, a point $P_i$ is selected. The distances of $P_i$ to the s (e.g., s=128) previous points are analyzed and at most three nearest neighbors of $P_i$ are selected to be used for prediction in the same manner as above.

The lifting transform is typically used for dense point cloud content and builds on top of the predicting transform. In lifting transform, each point is associated with an influence weight. Points in lower LOD are used more often and, therefore, impact the encoding process more significantly. The influence weight will be used to guide the quantization processes. The main difference is the lifting transform introduces an update operator and uses an adaptive quantization strategy.

Predicting transform and lifting transform can support low latency applications. In low latency applications, the number of LOD is set to 1 and the Morton sorting process is skipped. If the number of LOD is greater than 1 or the points are resorted, the points processing order of attribute decoding will be changed definitely comparing with that of geometry coding. The mismatch of processing orders will introduce delay between geometry and attribute which may affect the end-to-end latency.

3.4 Coding Parameter Classification

There are some coding parameters in the encoder to control the encoding of point cloud. Some of them are signaled to the decoder to support the decoding process. The parameters can be classified and stored in several clusters according to the affected part of each parameter, such as geometry parameter set (GPS), attribute parameter set (APS) and sequence parameter set (SPS). The parameters that control the geometry coding tools are stored in GPS. The parameters that control the attribute coding tools are stored in APS. For example, the parameters that describe the attribute category of point cloud sequence and the data accuracy of coding process are stored in SPS.

4. Problems

The existing designs for point cloud low latency tools in current G-PCC have the following problems:

1. For the attribute low latency tool inside a slice, the Morton sorting process is skipped for all points in the slice. However, the design is not flexible enough comparing with the geometry low latency tool inside a slice whose latency can be controlled by a variable. On the other hand, the latency inside a slice cannot be configured according to different latency requirements.
2. For the geometry low latency tool inside a slice, the prediction tree structure is generated every n points. However, in the case of no latency, i.e., the value of n is equal to 1, there will be no predicting for each point and the coding performance is limited.
3. In predictive geometry coding, the children number of each node is always signalled to construct the tree structure. However, for certain tree structures, such as the children number of every node is always equal to 1 (except for leaf node), there is no need to signal the children number information.

5. Detailed Solutions

To solve the above problems and some other problems not mentioned, methods as summarized below are disclosed.

The embodiments should be considered as examples to explain the general concepts and should not be interpreted in a narrow way. Furthermore, these embodiments can be applied individually or combined in any manner.

A coding unit such as a block, a box, a cube, a slice, a tile, a frame or any other units may refer to a unit involving a group of points in PCC.

1) A sorting variable may be used to control the sorting process inside a coding unit.
   a. In one example, the coding unit may be slice, tile, frame and so on.
   b. In one example, the points may be sorted according to their associated converted codes.
      i. In one example, the converted codes may be Morton codes, Hilbert codes, Gray codes and so on.
      ii. In one example, the sorting process may be performed in an ascending order or in a descending order.
   c. In one example, the points inside a coding unit may be processed by segments in the sorting process.
      i. The sorting segments in a coding unit may be generated according to the sorting variable.
      ii. In one example, the segments may be generated every N points in a coding unit.
         1. In one example, N is controlled by the sorting variable.
         2. In one example, the function between the sorting variable and N may be linear function, power function, exponential function, piecewise function and so on.
      iii. Alternatively, the point numbers in different segments may be different.
         1. In one example, the point number in different segments may be generated by the sorting variable.
         2. In one example, the function between the sorting variable and the point number in one segment may be linear function, power function, exponential function, piecewise function and so on.
      iv. In one example, if the sorting variable is equal to certain value, the sorting process may be disabled.
   d. In one example, the sorting variable may be signalled to the decoder in a bitstream unit.
      i. In one example, the bitstream unit may be slice header, attribute slice header, geometry slice header, APS, GPS, SPS and so on.
      ii. In one example, the sorting variable may be coded with fixed-length coding, unary coding, truncated unary coding and so on.
      iii. In one example, the sorting variable may be coded in a predictive way.
   e. In one example, the sorting variable may be derived by decoded information.
      i. In one example, the decoded information may come from slice header, attribute slice header, geometry slice header, APS, GPS, SPS and so on.
2) An indicator may be used to indicate whether the sorting variable is enabled or not.
   a. In one example, the indicator may be binary values.
      i. In one example, if the value of the indicator is equal to X (e.g., X=1), the sorting variable is disabled, i.e., the whole sorting is enabled. Otherwise (if it is equal to (1−X)), the sorting variable is enabled.
   b. The indicator may be signalled to the decoder in a bitstream unit.
      i. In one example, the bitstream unit may be slice header, attribute slice header, geometry slice header, APS, GPS, SPS and so on.
      ii. In one example, the indicator may be coded with fixed-length coding, unary coding, truncated unary coding, Exponential Golomb code and so on.
      iii. In one example, the indicator may be coded in a predictive way.
      iv. The indicator may be coded with at least one context.
      v. The indicator may be by-pass coded.
   c. Alternatively, the indicator may be derived at the decoder.
3) The sorting process described above may be used in attribute coding, geometry coding and some other coding processes.
4) An indicator may be used to indicate whether the tree structure of predictive geometry coding is totally signalled or not.
   a. In one example, the tree structure information may be composed of parent information, children information and so on.
   b. In one example, the tree structure information may be totally signalled to the decoder.
   c. Alternatively, the tree structure information may be partly signalled to the decoder.
   d. Alternatively, the tree structure information may be not signalled to the decoder.
   e. In one example, the indicator may be binary values.
      i. In one example, if the value of the indicator is equal to X (e.g., X=1), the tree structure of predictive geometry coding is totally signalled. Otherwise (if it is equal to (1-X)), the tree structure of predictive geometry coding is not signalled.
   f. In one example, the indicator may be pre-defined values.
      i. In one example, if the value of the indicator is equal to X, the tree structure of predictive geometry coding is totally signalled; If it is equal to Y, the tree structure of predictive geometry coding is partly signalled; If it is equal to Z, the tree structure information may be not signalled.
   g. The indicator may be signalled to the decoder in a bitstream unit.
      i. In one example, the bitstream unit may be slice header, attribute slice header, geometry slice header, APS, GPS, SPS and so on.
      ii. In one example, the indicator may be coded with fixed-length coding, unary coding, truncated unary coding and so on.
      iii. In one example, the indicator may be coded in a predictive way.
      iv. The indicator may be coded with at least one context.
      v. The indicator may be by-pass coded.
   h. Alternatively, the indicator may be derived at the decoder.

6. Embodiments

Figure 4:
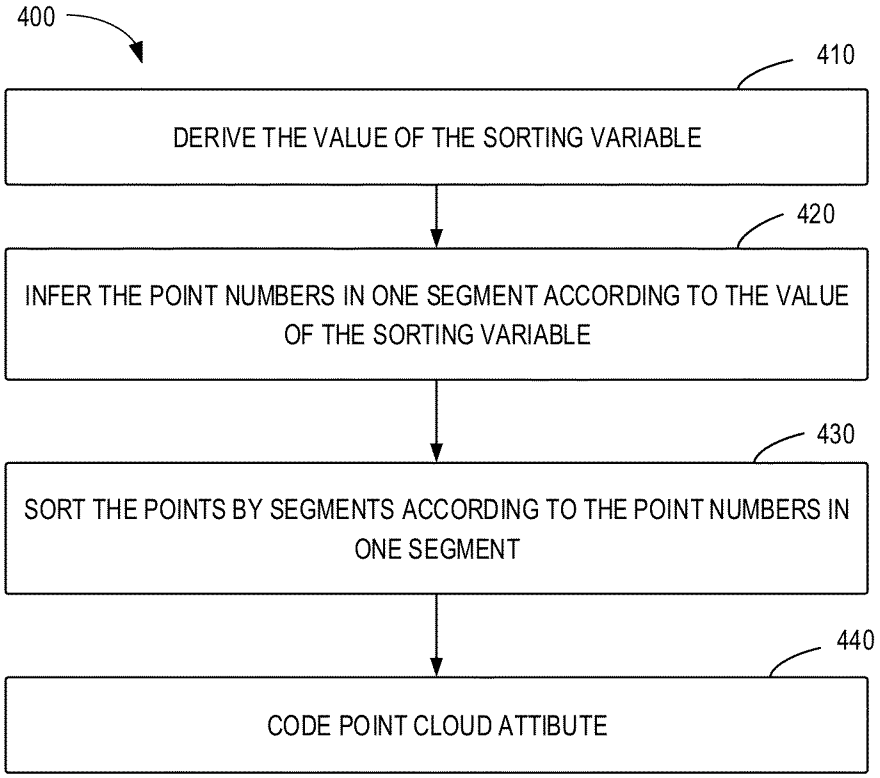
FIG. 4 illustrates an example coding flow of the improved point cloud latency tool in accordance with some embodiments of the present disclosure.

An example of the coding flow 410 for the improved point cloud low latency tools is depicted in FIG. 4. Firstly, at block 410, the value of the sorting variable will be derived. In the decoder side, it can be derived by input encoding parameters. In the decoder side, it can be derived by decoded information. Secondly, at block 420, the point numbers in one segment will be inferred according to the value of the sorting variable. The function between the sorting variable and the point numbers in one segment will be predefined. Thirdly, at block 430, the points will be sorted by segments according to the point numbers in one segment. Lastly, at block 440, the point cloud attribute will be coded according to the sorted point order.

Figure 5:
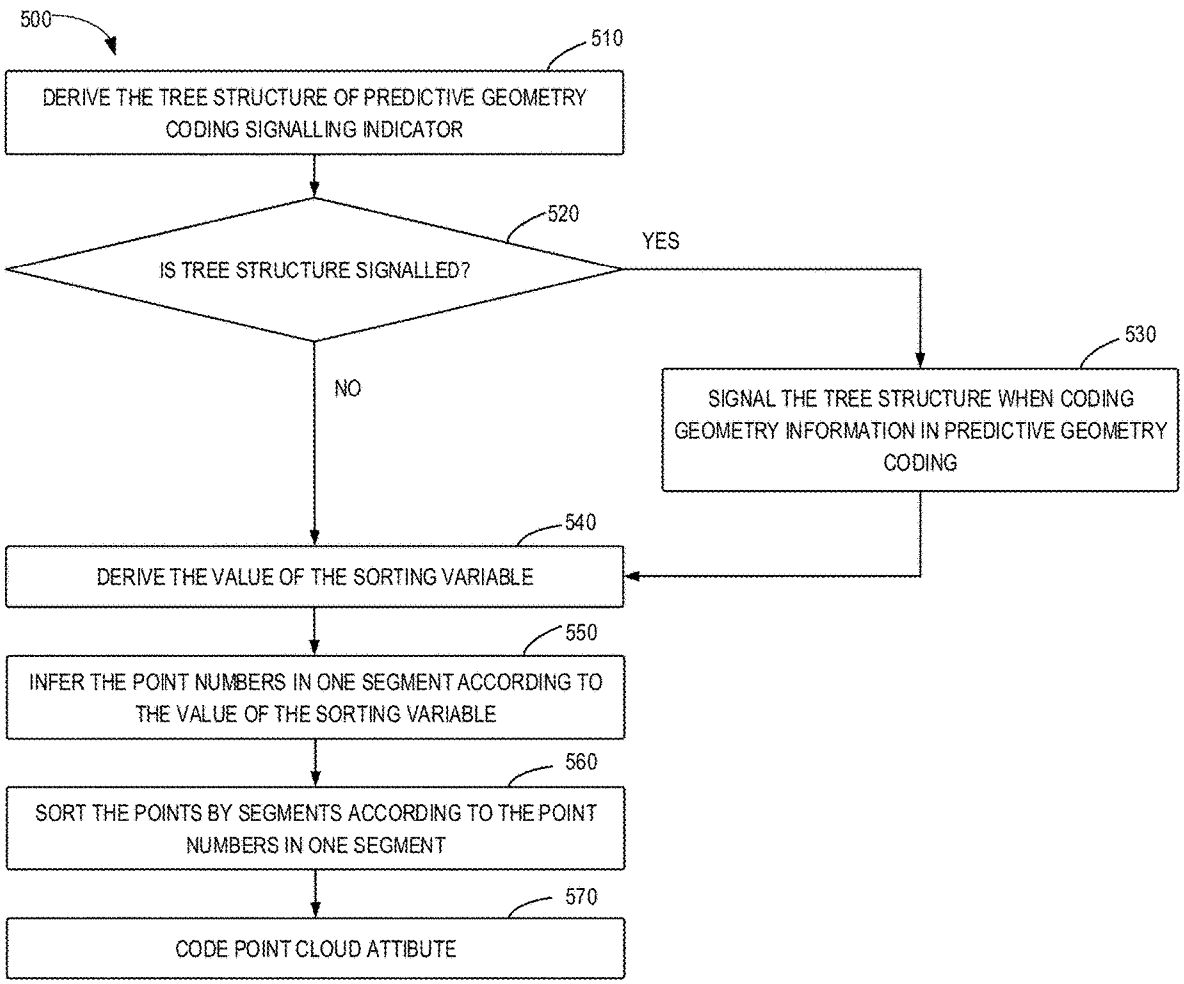
FIG. 5 illustrates another example coding flow of the improved point cloud latency tool in accordance with some embodiments of the present disclosure.

Another example of the coding flow 500 for the improved point cloud low latency tools is depicted in FIG. 5. In this example, the geometry improvement is applied. Firstly, at block 510, the tree structure of predictive geometry coding signalling indicator will be derived. In the encoder side, the indicator can be derived by input encoding parameters. In the decoder side, the indicator can be derived by decoded information. At block 520, whether tree structure is signalled is determined. If tree structure is signalled according to the indicator, at block 530, the tree structure will be signalled when coding geometry information in predictive geometry coding. Otherwise, the tree structure will not be signalled when coding geometry information in predictive geometry coding. Secondly, at block 540, the value of the sorting variable will be derived. In the decoder side, it can be derived by input encoding parameters. In the decoder side, it can be derived by decoded information. Thirdly, at block 550, the point numbers in one segment will be Inferred according to the value of the sorting variable, the function between the sorting variable and the point numbers in one segment will be predefined. Then, at block 560, the points will be sorted by segments according to the point numbers in one segment. Lastly, at block 570, the point cloud attribute will be coded according to the sorted point order.

The embodiments of the present disclosure are related to points sorting and tree structure information for point cloud coding. As used herein, the term "point cloud sequence" may refer to a sequence of one or more point clouds. The term "frame" may refer to a point cloud in a point cloud sequence. The term "point cloud" may refer to a frame in the point cloud sequence. The term "coding unit" may refer to a block, a box, a cube, a slice, a tile, a frame, or any other units involving a group of points in PCC.

Figure 6:
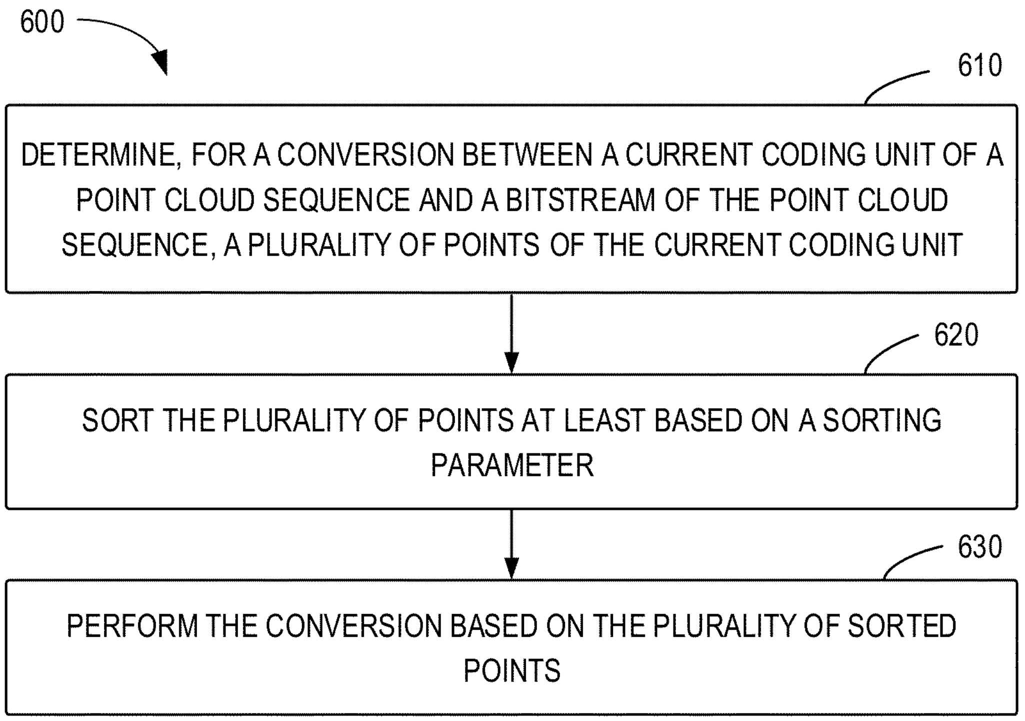
FIG. 6 illustrates a flowchart of a method for point cloud coding in accordance with some embodiments of the present disclosure.

FIG. 6 illustrates a flowchart of a method 600 for point cloud coding in accordance with embodiments of the present disclosure. The method 600 may be implemented for a conversion between a current video block of a point cloud sequence and a bitstream of the point cloud sequence. By way of example, the current coding unit may comprise one of: a slice, a tile, a frame, or a further coding unit involving at least one point of the point cloud sequence.

As shown in FIG. 6, the method 600 starts at block 610, where a plurality of points of the current video unit is determined. At block 620, the plurality of points is sorted at least based on a sorting parameter. As used herein, the term "sorting parameter" may also be referred to as "sorting variable". By sorting the plurality of points based on the sorting parameter, the sorting latency can be reduced. Accordingly, coding efficiency can be improved.

At block 630, the conversion is performed based on the plurality of sorted points. In some embodiments the conversion may include encoding the current coding unit into the bitstream. Alternatively, or in addition, the conversion may include decoding the current coding unit from the bitstream.

In some embodiments, at block 620, the plurality of points is sorted based on associated converted code types of the plurality of points. By way of example, an associated converted code type of a point comprises at least one of: a Morton code, a Hilbert code, or a Gray code.

In some embodiments, at block 620, the plurality of points may be sorted in an ascending order or a descending order.

In some embodiments, sorting the plurality of points comprises: grouping the plurality of points into at least one segment of points; and sorting the at least one segment of points. In this way, the latency of the sorting process can be reduced, and thus a low latency tool can be achieved.

In some embodiments, the plurality of points is grouped into the at least one segment of points based on the sorting parameter. That is, sorting segments (also referred to as segments) in the current coding unit may be generated according to the sorting parameter. The sorting segments may be sorted.

In some embodiments, a target number of points may be added from the plurality of points into a segment of the at least one segment. For example, the segments may be generated every N points in the coding unit. N is an integer. As used herein, "N" may be referred to as the target number.

In some embodiments, the target number is associated with the sorting parameter. That is, N is controlled by the sorting parameter. In some embodiments, an association between the target number and the sorting parameter comprises one of: a linear association, a power association, an exponential association, or a piecewise association. For example, a function between the sorting parameter and N may be linear function, power function, exponential function, piecewise function, and the like.

In some embodiments, a first number of points in a first segment of the at least one segment is different from a second number of points in a second segment of the at least one segment. That is, the point numbers in different segments may be different.

In some embodiments, the method 600 further comprises: determining at least one number for the at least one segment based on the sorting parameter. For example, the point number in different segments may be generated by the sorting parameter.

In some embodiments, the at least one number is determined by using an association between the at least one number and the sorting parameter, the association comprising one of: a linear association, a power association, an exponential association, or a piecewise association. For example, a function between the sorting parameter and the point number in one segment may be linear function, power function, exponential function, piecewise function, and the like.

In some embodiments, the sorting parameter is a predefined value, and the sorting of the plurality of points is disabled. For example, if the sorting parameter is equal to a certain value, the sorting process may be disabled.

In some embodiments, the sorting parameter is in a bitstream unit in the bitstream. For example, the sorting parameter may be signalled to the decoder in a bitstream unit.

In some embodiments, the bitstream unit comprises at least one of: a slice header, an attribute slice header, a geometry slice header, an attribute parameter set (APS), a geometry parameter set (GPS), or a sequence parameter set (SPS).

In some embodiments, the sorting parameter is coded with at least one of: a fixed-length coding tool, a unary coding tool, or a truncated unary coding tool.

In some embodiments, the sorting parameter is coded with a predictive coding tool. That is, the sorting parameter may be coded in a predictive way.

In some embodiments, the method 600 further comprises: determining the sorting parameter based on decoded information. That is, the sorting parameter may be derived by decoded information.

In some embodiments, the decoded information is in at least one of: a slice header, an attribute slice header, a geometry slice header, an attribute parameter set (APS), a geometry parameter set (GPS), or a sequence parameter set (SPS).

In some embodiments, an indicator indicative of enabling the sorting parameter is included in a bitstream unit in the bitstream. For example, the indicator may be used to indicate whether the sorting parameter is enabled or not. The indicator may be signalled to the decoder in the bitstream unit.

In some embodiments, the bitstream unit comprises at least one of: a slice header, an attribute slice header, a geometry slice header, an attribute parameter set (APS), a geometry parameter set (GPS), or a sequence parameter set (SPS).

In some embodiments, the indicator is coded with at least one of: a fixed-length coding tool, a unary coding tool, a truncated unary coding tool, or an Exponential Golomb coding tool.

In some embodiments, the indicator is coded with a predictive coding tool. That is, the indicator may be coded in a predictive way.

In some embodiments, the indicator is coded with at least one context.

In some embodiments, the indicator is by-pass coded.

In some embodiments, the method 600 further comprises: determining an indicator indicative of enabling the sorting parameter at a decoding side associated with the conversion. For example, the indicator may be derived at the decoder.

In some embodiments, the indicator is a binary value.

In some embodiments, the indicator is a first binary value, the sorting parameter is disabled, and the sorting of the plurality of points is enabled. In some embodiments, the indicator is a second binary value, and the sorting parameter is enabled. For example, the first binary value may be 1, and the second binary value may be 0. For another example, the first binary value may be 0, and the second binary value may be 1.

In some embodiments, the sorting of the plurality of points is used in at least one of: an attribute coding, a geometry coding, or a further coding process. That is, the sorting process described herein may be used in attribute coding, geometry coding, and some other coding processed.

According to further embodiments of the present disclosure, a non-transitory computer-readable recording medium is provided. A bitstream of a point cloud sequence is stored in the non-transitory computer-readable recording medium. The bitstream of the point cloud sequence is generated by a method performed by a point cloud sequence processing apparatus. According to the method, a plurality of points of a current coding unit of the point cloud sequence is determined. The plurality of points is sorted at least based on a sorting parameter. The bitstream is generated based on the plurality of sorted points.

According to still further embodiments of the present disclosure, a method for storing a bitstream of a point cloud sequence is proposed. In the method, a plurality of points of a current coding unit of the point cloud sequence is determined. The plurality of points is sorted at least based on a sorting parameter. The bitstream is generated based on the plurality of sorted points. The bitstream is stored in a non-transitory computer-readable recording medium.

Figure 7:
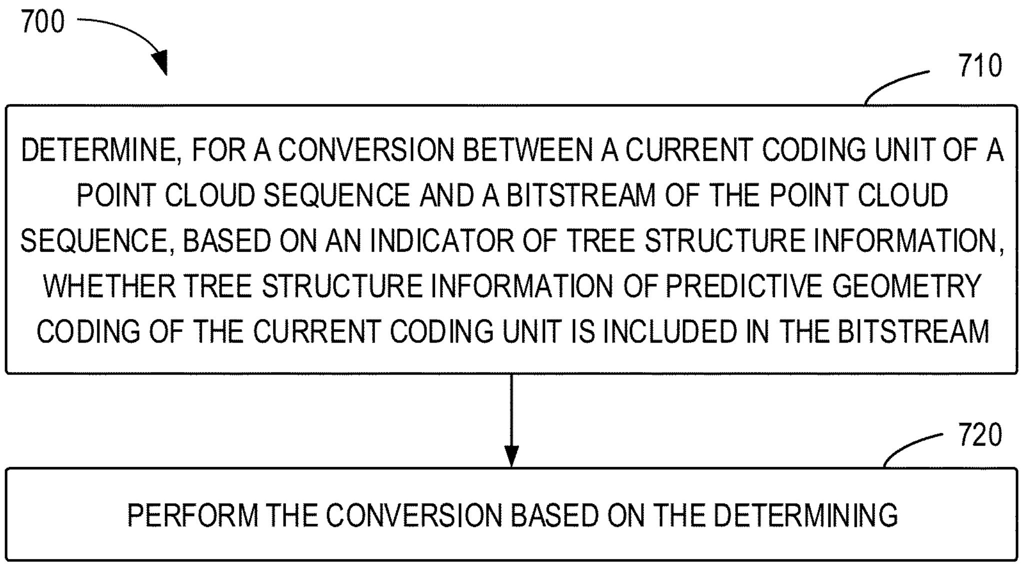
FIG. 7 illustrates a flowchart of another method for point cloud coding in accordance with some embodiments of the present disclosure.

FIG. 7 illustrates a flowchart of a method 700 for point cloud coding in accordance with embodiments of the present disclosure. The method 700 may be implemented for a conversion between a current coding unit of a point cloud sequence and a bitstream of the point cloud sequence. By way of example, the current coding unit may comprise one of: a slice, a tile, a frame, or a further coding unit involving at least one point of the point cloud sequence.

As shown in FIG. 7, the method 700 starts at block 710, where whether tree structure information of predictive geometry coding of the current coding unit is included in the bitstream is determined based on an indicator of tree structure information. As used herein, the term "indicator of tree structure information" may be referred to as an "indicator".

At block 720, the conversion is performed based on the determining. In some embodiments the conversion may include encoding the current coding unit into the bitstream. Alternatively, or in addition, the conversion may include decoding the current coding unit from the bitstream.

The method 700 enables determining whether the tree structure information is included or signaled in the bitstream based on an indicator of tree structure information. In this way, the latency of the conversion can be reduced, and thus a low latency tool can be achieved. Accordingly, coding efficiency can be improved.

In some embodiments, the tree structure information comprises at least one of: parent information associated with a parent node of a tree structure of the current coding unit, or children information associated with at least one child node of the tree structure.

In some embodiments, the tree structure information is included in the bitstream, or partial of the tree structure information is included in the bitstream. For example, the tree structure information may be totally signalled to the decoder. Alternatively, the tree structure information may be partly signalled to the decoder.

In some embodiments, the tree structure information is not included in the bitstream.

In some embodiments, the indicator is a binary value.

In some embodiments, the indicator is a first binary value, and the indicator indicates that the tree structure information is included in the bitstream. Alternatively, or in addition, in some embodiments, the indicator is a second binary value, and the indicator indicates that the tree structure information is not included in the bitstream. For example, the first binary value may be 1, and the second binary value may be 0. For another example, the first binary value may be 0, and the second binary value may be 1.

In some embodiments, the indicator is a predefined value.

In some embodiments, the indicator is a first predefined value, and the indicator indicates that the tree structure information is included in the bitstream. For example, if the value of the indicator is equal to the first predefined value, the tree structure of predictive geometry coding is totally signaled.

In some embodiments, the indicator is a second predefined value, and the indicator indicates that partial of the tree structure information is included in the bitstream. For example, if the value of the indicator is equal to the second predefined value, the tree structure of predictive geometry coding is partly signaled.

In some embodiments, the indicator is a third predefined value, and the indicator indicates that the tree structure information is not included in the bitstream. For example, if the value of the indicator is equal to the third predefined value, the tree structure of predictive geometry coding is not signaled.

In some embodiments, the indicator is included in a bitstream unit in the bitstream. For example, the indicator may be signalled to the decoder in a bitstream unit.

In some embodiments, the bitstream unit comprises at least one of: a slice header, an attribute slice header, a geometry slice header, an attribute parameter set (APS), a geometry parameter set (GPS), or a sequence parameter set (SPS).

In some embodiments, the indicator is coded with at least one of: a fixed-length coding tool, a unary coding tool, or a truncated unary coding tool.

In some embodiments, the indicator is coded with a predictive coding tool. For example, the indicator may be coded in a predictive way.

In some embodiments, the indicator is coded with at least one context.

In some embodiments, the indicator is by-pass coded.

In some embodiments, the method 700 further comprises: determining the indicator at a decoding side associated with the conversion. That is, the indicator may be derived at the decoder.

According to further embodiments of the present disclosure, a non-transitory computer-readable recording medium is provided. A bitstream of a point cloud sequence is stored in the non-transitory computer-readable recording medium. The bitstream of the point cloud sequence is generated by a method performed by a point cloud sequence processing apparatus. According to the method, whether tree structure information of predictive geometry coding of a current coding unit of the point cloud sequence is included in the bitstream is determined based on an indicator of tree structure information. The bitstream is generated based on the determining.

According to still further embodiments of the present disclosure, a method for storing a bitstream of a point cloud sequence is proposed. In the method, whether tree structure information of predictive geometry coding of a current coding unit of the point cloud sequence is included in the bitstream is determined based on an indicator of tree structure information. The bitstream is generated based on the determining. The bitstream is stored in a non-transitory computer-readable recording medium.

It is to be understood that the above method 600 and/or method 700 may be used in combination or separately. For example, an example combination of the method 600 and method 700 may be the coding flow 500 in FIG. 5. It is to be understood that any suitable combination of these methods may be applied. Scope of the present disclosure is not limited in this regard.

By using these methods 600 and/or 700 separately or in combination, the latency of the conversion particularly the latency of the sorting process can be reduced, and thus a low latency tool can be achieved. Accordingly, coding efficiency can be improved. Thus, the coding effectiveness and coding efficiency of the point cloud coding can be improved.

Implementations of the present disclosure can be described in view of the following clauses, the features of which can be combined in any reasonable manner.

Clause 1. A method for point cloud coding, comprising: determining, for a conversion between a current coding unit of a point cloud sequence and a bitstream of the point cloud sequence, a plurality of points of the current coding unit; sorting the plurality of points at least based on a sorting parameter; and performing the conversion based on the plurality of sorted points.

Clause 2. The method of clause 1, wherein the current coding unit comprises one of: a slice, a tile, or a frame.

Clause 3. The method of clause 1 or clause 2, wherein the plurality of points is sorted based on associated converted code types of the plurality of points.

Clause 4. The method of clause 3, wherein an associated converted code type of a point comprises at least one of: a Morton code, a Hilbert code, or a Gray code.

Clause 5. The method of any of clauses 1-4, wherein sorting the plurality of points comprises: sorting the plurality of points in an ascending order or a descending order.

Clause 6. The method of any of clauses 1-5, wherein sorting the plurality of points comprises: grouping the plurality of points into at least one segment of points; and sorting the at least one segment of points.

Clause 7. The method of clause 6, wherein the plurality of points is grouped into the at least one segment of points based on the sorting parameter.

Clause 8. The method of clause 6 or clause 7, wherein grouping the plurality of points into at least one segment of points comprises: adding a target number of points from the plurality of points into a segment of the at least one segment.

Clause 9. The method of clause 8, wherein the target number is associated with the sorting parameter.

Clause 10. The method of clause 9, wherein an association between the target number and the sorting parameter comprises one of: a linear association, a power association, an exponential association, or a piecewise association.

Clause 11. The method of clause 6 or clause 7, wherein a first number of points in a first segment of the at least one segment is different from a second number of points in a second segment of the at least one segment.

Clause 12. The method of any of clauses 6-11, further comprising: determining at least one number for the at least one segment based on the sorting parameter.

Clause 13. The method of clause 12, wherein the at least one number is determined by using an association between the at least one number and the sorting parameter, the association comprising one of: a linear association, a power association, an exponential association, or a piecewise association.

Clause 14. The method of any of clauses 1-13, wherein the sorting parameter is a predefined value, and the sorting of the plurality of points is disabled.

Clause 15. The method of any of clauses 1-14, wherein the sorting parameter is in a bitstream unit in the bitstream.

Clause 16. The method of clause 15, wherein the bitstream unit comprises at least one of: a slice header, an attribute slice header, a geometry slice header, an attribute parameter set (APS), a geometry parameter set (GPS), or a sequence parameter set (SPS).

Clause 17. The method of any of clauses 1-16, wherein the sorting parameter is coded with at least one of: a fixed-length coding tool, a unary coding tool, or a truncated unary coding tool.

Clause 18. The method of any of clauses 1-17, wherein the sorting parameter is coded with a predictive coding tool.

Clause 19. The method of any of clauses 1-18, further comprising: determining the sorting parameter based on decoded information.

Clause 20. The method of clause 19, wherein the decoded information is in at least one of: a slice header, an attribute slice header, a geometry slice header, an attribute parameter set (APS), a geometry parameter set (GPS), or a sequence parameter set (SPS).

Clause 21. The method of any of clauses 1-20, wherein an indicator indicative of enabling the sorting parameter is included in a bitstream unit in the bitstream.

Clause 22. The method of clause 21, wherein the bitstream unit comprises at least one of: a slice header, an attribute slice header, a geometry slice header, an attribute parameter set (APS), a geometry parameter set (GPS), or a sequence parameter set (SPS).

Clause 23. The method of clause 21 or clause 22, wherein the indicator is coded with at least one of: a fixed-length coding tool, a unary coding tool, a truncated unary coding tool, or an Exponential Golomb coding tool.

Clause 24. The method of any of clauses 21-23, wherein the indicator is coded with a predictive coding tool.

Clause 25. The method of any of clauses 21-24, wherein the indicator is coded with at least one context.

Clause 26. The method of any of clauses 21-25, wherein the indicator is by-pass coded.

Clause 27. The method of any of clauses 1-20, further comprising: determining an indicator indicative of enabling the sorting parameter at a decoding side associated with the conversion.

Clause 28. The method of any of clauses 21-27, wherein the indicator is a binary value.

Clause 29. The method of clause 28, wherein the indicator is a first binary value, the sorting parameter is disabled, and the sorting of the plurality of points is enabled.

Clause 30. The method of clause 28 or clause 29, wherein the indicator is a second binary value, and the sorting parameter is enabled.

Clause 31. The method of any of clauses 1-30, wherein the sorting of the plurality of points is used in at least one of: an attribute coding, a geometry coding, or a further coding process.

Clause 32. A method for point cloud coding, comprising: determining, for a conversion between a current coding unit of a point cloud sequence and a bitstream of the point cloud sequence, based on an indicator of tree structure information, whether tree structure information of predictive geometry coding of the current coding unit is included in the bitstream; and performing the conversion based on the determining.

Clause 33. The method of clause 32, wherein the current coding unit comprises one of: a slice, a tile, or a frame.

Clause 34. The method of clause 32 or clause 33, wherein the tree structure information comprises at least one of: parent information associated with a parent node of a tree structure of the current coding unit, or children information associated with at least one child node of the tree structure.

Clause 35. The method of any of clauses 32-34, wherein the tree structure information is included in the bitstream, or partial of the tree structure information is included in the bitstream.

Clause 36. The method of any of clauses 32-34, wherein the tree structure information is not included in the bitstream.

Clause 37. The method of any of clauses 32-36, wherein the indicator is a binary value.

Clause 38. The method of clause 37, wherein the indicator is a first binary value, and the indicator indicates that the tree structure information is included in the bitstream.

Clause 39. The method of clause 27 or clause 38, wherein the indicator is a second binary value, and the indicator indicates that the tree structure information is not included in the bitstream.

Clause 40. The method of any of clauses 32-36, wherein the indicator is a predefined value.

Clause 41. The method of clause 40, wherein the indicator is a first predefined value, and the indicator indicates that the tree structure information is included in the bitstream.

Clause 42. The method of clause 40 or clause 41, wherein the indicator is a second predefined value, and the indicator indicates that partial of the tree structure information is included in the bitstream.

Clause 43. The method of any of clauses 40-42, wherein the indicator is a third predefined value, and the indicator indicates that the tree structure information is not included in the bitstream.

Clause 44. The method of any of clauses 32-43, wherein the indicator is included in a bitstream unit in the bitstream.

Clause 45. The method of clause 44, wherein the bitstream unit comprises at least one of: a slice header, an attribute slice header, a geometry slice header, an attribute parameter set (APS), a geometry parameter set (GPS), or a sequence parameter set (SPS).

Clause 46. The method of clause 44 or clause 45, wherein the indicator is coded with at least one of: a fixed-length coding tool, a unary coding tool, or a truncated unary coding tool.

Clause 47. The method of any of clauses 44-46, wherein the indicator is coded with a predictive coding tool.

Clause 48. The method of any of clauses 44-47, wherein the indicator is coded with at least one context.

Clause 49. The method of any of clauses 44-48, wherein the indicator is by-pass coded.

Clause 50. The method of any of clauses 32-49, further comprising: determining the indicator at a decoding side associated with the conversion.

Clause 51. The method of any of clauses 1-50, wherein the conversion includes encoding the current coding unit into the bitstream.

Clause 52. The method of any of clauses 1-50, wherein the conversion includes decoding the current coding unit from the bitstream.

Clause 53. An apparatus for point cloud coding comprising a processor and a non-transitory memory with instructions thereon, wherein the instructions upon execution by the processor, cause the processor to perform a method in accordance with any of clauses 1-52.

Clause 54. A non-transitory computer-readable storage medium storing instructions that cause a processor to perform a method in accordance with any of clauses 1-52.

Clause 55. A non-transitory computer-readable recording medium storing a bitstream of a point cloud sequence which is generated by a method performed by a point cloud processing apparatus, wherein the method comprises: determining a plurality of points of a current coding unit of the point cloud sequence; sorting the plurality of points at least based on a sorting parameter; and generating the bitstream based on the plurality of sorted points.

Clause 56. A method for storing a bitstream of a point cloud sequence, comprising: determining a plurality of points of a current coding unit of the point cloud sequence; sorting the plurality of points at least based on a sorting parameter; generating the bitstream based on the plurality of sorted points; and storing the bitstream in a non-transitory computer-readable recording medium.

Clause 57. A non-transitory computer-readable recording medium storing a bitstream of a point cloud sequence which is generated by a method performed by a point cloud processing apparatus, wherein the method comprises: determining, based on an indicator of tree structure information, whether tree structure information of predictive geometry coding of a current coding unit of the point cloud sequence is included in the bitstream; and generating the bitstream based on the determining.

Clause 58. A method for storing a bitstream of a point cloud sequence, comprising: determining, based on an indicator of tree structure information, whether tree structure information of predictive geometry coding of a current coding unit of the point cloud sequence is included in the bitstream; generating the bitstream based on the determining; and storing the bitstream in a non-transitory computer-readable recording medium.

Example Device

Figure 8:
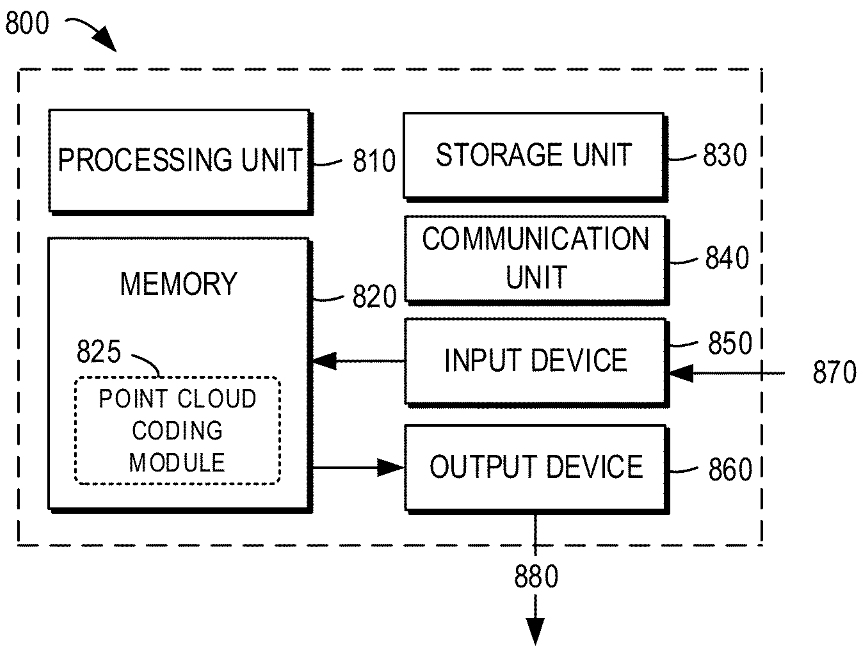
FIG. 8 illustrates a block diagram of a computing device in which various embodiments of the present disclosure can be implemented.

FIG. 8 illustrates a block diagram of a computing device 800 in which various embodiments of the present disclosure can be implemented. The computing device 800 may be implemented as or included in the source device 110 (or the GPCC encoder 116 or 200) or the destination device 120 (or the GPCC decoder 126 or 300).

It would be appreciated that the computing device 800 shown in FIG. 8 is merely for purpose of illustration, without suggesting any limitation to the functions and scopes of the embodiments of the present disclosure in any manner.

As shown in FIG. 8, the computing device 800 includes a general-purpose computing device 800. The computing device 800 may at least comprise one or more processors or processing units 810, a memory 820, a storage unit 830, one or more communication units 840, one or more input devices 850, and one or more output devices 860.

In some embodiments, the computing device 800 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 800 can support any type of interface to a user (such as "wearable" circuitry and the like).

The processing unit 810 may be a physical or virtual processor and can implement various processes based on programs stored in the memory 820. In a multi-processor system, multiple processing units execute computer executable instructions in parallel so as to improve the parallel processing capability of the computing device 800. The processing unit 810 may also be referred to as a central processing unit (CPU), a microprocessor, a controller or a microcontroller.

The computing device 800 typically includes various computer storage medium. Such medium can be any medium accessible by the computing device 800, including, but not limited to, volatile and non-volatile medium, or detachable and non-detachable medium. The memory 820 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 830 may be any detachable or non-detachable medium and may include a machine-readable medium such as a memory, flash memory drive, magnetic disk or another other media, which can be used for storing information and/or data and can be accessed in the computing device 800.

The computing device 800 may further include additional detachable/non-detachable, volatile/non-volatile memory medium. Although not shown in FIG. 8, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 840 communicates with a further computing device via the communication medium. In addition, the functions of the components in the computing device 800 can be implemented by a single computing cluster or multiple computing machines that can communicate via communication connections. Therefore, the computing device 800 can operate in a networked environment using a logical connection with one or more other servers, networked personal computers (PCs) or further general network nodes.

The input device 850 may be one or more of a variety of input devices, such as a mouse, keyboard, tracking ball, voice-input device, and the like. The output device 860 may be one or more of a variety of output devices, such as a display, loudspeaker, printer, and the like. By means of the communication unit 840, the computing device 800 can further communicate with one or more external devices (not shown) such as the storage devices and display device, with one or more devices enabling the user to interact with the computing device 800, or any devices (such as a network card, a modem and the like) enabling the computing device 800 to communicate with one or more other computing devices, if required. Such communication can be performed via input/output (I/O) interfaces (not shown).

In some embodiments, instead of being integrated in a single device, some or all components of the computing device 800 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 800 may be used to implement point cloud encoding/decoding in embodiments of the present disclosure. The memory 820 may include one or more point cloud coding modules 825 having one or more program instructions. These modules are accessible and executable by the processing unit 810 to perform the functionalities of the various embodiments described herein.

In the example embodiments of performing point cloud encoding, the input device 850 may receive point cloud data as an input 870 to be encoded. The point cloud data may be processed, for example, by the point cloud coding module 825, to generate an encoded bitstream. The encoded bitstream may be provided via the output device 860 as an output 880.

In the example embodiments of performing point cloud decoding, the input device 850 may receive an encoded bitstream as the input 870. The encoded bitstream may be processed, for example, by the point cloud coding module 825, to generate decoded point cloud data. The decoded point cloud data may be provided via the output device 860 as the output 880.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for point cloud coding, comprising:

determining, for a conversion between a current coding unit of a point cloud sequence and a bitstream of the point cloud sequence, a plurality of points of the current coding unit;

determining at least one number for at least one segment of the plurality of points based on a sorting parameter;

sorting the at least one segment of the plurality of points based on the sorting parameter; and performing the conversion based on the sorting, wherein the at least one number is determined by using an association between the at least one number and the sorting parameter the association comprising one of: a linear association, a power association, an exponential association, or a piecewise association.

2. The method of claim 1, wherein the current coding unit comprises one of: a slice, a tile, or a frame, wherein the plurality of points is sorted based on associated converted code types of the plurality of points, wherein an associated converted code type of a point comprises at least one of: a Morton code, a Hilbert code, or a Gray code.

3. The method of claim 1, wherein sorting the plurality of points comprises: sorting the plurality of points in an ascending order or a descending order.

4. The method of claim 1, wherein sorting the at least one segment of the plurality of points comprises:

grouping the plurality of points into the at least one segment based on the at least one number; and sorting the at least one segment of points.

5. The method of claim 4, wherein grouping the plurality of points into the at least one segment of points comprises:

adding a target number of points from the plurality of points into a segment of the at least one segment, wherein the target number is associated with the sorting parameter, wherein an association between the target number and the sorting parameter comprises one of: a linear association, a power association, an exponential association, or a piecewise association, or wherein a first number of points in a first segment of the at least one segment is different from a second number of points in a second segment of the at least one segment.

6. The method of claim 1, wherein the sorting parameter is a predefined value, and the sorting of the plurality of points is disabled.

7. The method of claim 1, wherein the sorting parameter is in a bitstream unit in the bitstream, wherein the bitstream unit comprises at least one of: a slice header, an attribute slice header, a geometry slice header, an attribute parameter set (APS), a geometry parameter set (GPS), or a sequence parameter set (SPS).

8. The method of claim 1, wherein the sorting parameter is coded with at least one of:

a fixed-length coding tool, a unary coding tool, or a truncated unary coding tool.

9. The method of claim 1, wherein the sorting parameter is coded with a predictive coding tool.

10. The method of claim 1, further comprising:

determining the sorting parameter based on decoded information, wherein the decoded information is in at least one of: a slice header, an attribute slice header, a geometry slice header, an attribute parameter set (APS), a geometry parameter set (GPS), or a sequence parameter set (SPS).

11. The method of claim 1, wherein an indicator indicative of enabling the sorting parameter is included in a bitstream unit in the bitstream, wherein the bitstream unit comprises at least one of: a slice header, an attribute slice header, a geometry slice header, an attribute parameter set (APS), a geometry parameter set (GPS), or a sequence parameter set (SPS), wherein the indicator is coded with at least one of: a fixed-length coding tool, a unary coding tool, a truncated unary coding tool, or an Exponential Golomb coding tool, or wherein the indicator is coded with a predictive coding tool, or wherein the indicator is coded with at least one context, or wherein the indicator is by-pass coded, or wherein the indicator is a binary value.

12. The method of claim 1, further comprising:

determining an indicator indicative of enabling the sorting parameter at a decoding side associated with the conversion.

13. The method of claim 12, wherein the indicator is a binary value, wherein the indicator is a first binary value, the sorting parameter is disabled, and the sorting of the plurality of points is enabled, or wherein the indicator is a second binary value, and the sorting parameter is enabled.

14. The method of claim 1, wherein the sorting of the plurality of points is used in at least one of: an attribute coding, a geometry coding, or a further coding process.

15. The method of claim 1, wherein the conversion includes encoding the current coding unit into the bitstream.

16. The method of claim 1, wherein the conversion includes decoding the current coding unit from the bitstream.

17. An apparatus for processing point cloud data, comprising a processor and a non-transitory memory with instructions thereon, wherein the instructions upon execution by the processor, cause the processor to:

determine, for a conversion between a current coding unit of a point cloud sequence and a bitstream of the point cloud sequence, a plurality of points of the current coding unit;

determine at least one number for at least one segment of the plurality of points based on a sorting parameter;

sort the at least one segment of the plurality of points based on the sorting parameter; and perform the conversion based on the sorting, wherein the at least one number is determined by using an association between the at least one number and the sorting parameter, the association comprising one of: a linear association, a power association, an exponential association, or a piecewise association.

18. A non-transitory computer-readable storage medium storing instructions that cause a processor to:

determine, for a conversion between a current coding unit of a point cloud sequence and a bitstream of the point cloud sequence, a plurality of points of the current coding unit;

determine at least one number for at least one segment of the plurality of points based on a sorting parameter;

sort the at least one segment of the plurality of points based on the sorting parameter; and perform the conversion based on the sorting, wherein the at least one number is determined by using an association between the at least one number and the sorting parameter the association comprising one of: a linear association, a power association, an exponential association, or a piecewise association.

19. A method for storing a bitstream of a point cloud sequence, comprising:

determining a plurality of points of a current coding unit of the point cloud sequence;

determining at least one number for at least one segment of the plurality of points based on a sorting parameter;

sorting the at least one segment of the plurality of points based on the sorting parameter;

generating the bitstream based on the sorting; and storing the bitstream in a non-transitory computer-readable recording medium, wherein the at least one number is determined by using an association between the at least one number and the sorting parameter, the association comprising one of: a linear association, a power association, an exponential association, or a piecewise association.

* * * * *